(12) United States Patent
Hampikian

(10) Patent No.: US 11,474,500 B2
(45) Date of Patent: Oct. 18, 2022

(54) METHOD FOR CONFIGURING AN INDUSTRIAL AUTOMATION SYSTEM

(71) Applicant: Schneider Electric Industries SAS, Rueil Malmaison (FR)

(72) Inventor: Pascal Hampikian, Paris (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 309 days.

(21) Appl. No.: 16/896,301

(22) Filed: Jun. 9, 2020

(65) Prior Publication Data

US 2020/0409340 A1 Dec. 31, 2020

(30) Foreign Application Priority Data

Jun. 25, 2019 (EP) .................................... 19305835

(51) Int. Cl.
*G05B 19/4155* (2006.01)
*H04L 67/104* (2022.01)
*G05B 19/00* (2006.01)
*G06F 16/182* (2019.01)

(52) U.S. Cl.
CPC ......... *G05B 19/4155* (2013.01); *G05B 19/00* (2013.01); *H04L 67/104* (2013.01); *G05B 2219/31368* (2013.01); *G06F 16/1837* (2019.01)

(58) Field of Classification Search
CPC . H04L 61/45; H04L 61/2575; H04L 65/1104; H04L 65/00; H04L 67/104; H04L 67/141; H04L 67/10; H04L 67/125; H04L 69/18; H04L 61/157; H04L 67/26; H02P 1/00; H02P 1/24; H02P 1/26; H02P 1/42; H02P 1/46; H02P 6/12; H02P 6/26; H02P 6/32; H02P 7/00; H02P 8/34; H02P 9/00; H02P 9/007; H02P 21/00; H02P 21/0003; H02P 21/0025; H02P 23/00; H02P 25/00; H02P 27/00; H02P 29/00; H02P 2207/05
See application file for complete search history.

(56) References Cited

U.S. PATENT DOCUMENTS

| | | | |
|---|---|---|---|
| 2008/0079560 A1 | 4/2008 | Hall et al. | |
| 2016/0147206 A1 | 5/2016 | Neitzel et al. | |
| 2018/0309831 A1* | 10/2018 | Sherman | H04L 12/66 |

OTHER PUBLICATIONS

Extended European Search Report for European Patent Application No. EP19305835.1 dated Dec. 4, 2019, 6 pages.

* cited by examiner

*Primary Examiner* — Antony M Paul
(74) *Attorney, Agent, or Firm* — Locke Lord LLP

(57) ABSTRACT

A method for configuring peer-to-peer communication in an industrial automation system including at least two control devices, each control device being arranged for hosting as separate instances an OPC UA server, an OPC UA subscriber service, and an OPC UA publisher service, the method including retrieving an OPC UA object list for each control device, the object list indicating all OPC UA objects managed by each respective control device, and presenting the OPC UA objects and control devices for user input. The method further including obtaining user input, configuring for each control device publisher and subscriber service parameters in a configuration file for each respective control device, and transferring the configuration file to the publisher and subscriber services of each respective control device. Also disclosed are an industrial automation system and industrial control devices configured to implement the disclosed method.

10 Claims, 4 Drawing Sheets

METHOD FOR CONFIGURING AN INDUSTRIAL AUTOMATION SYSTEM

The present invention relates to a method for configuring an industrial automation system, and in particular for configuring a publisher-subscribe service for peer-to-peer communication in a system operating in accordance with OPC Unified Architecture framework.

BACKGROUND

Industrial automation systems are provided to perform, control and supervise industrial processes. The equipment used to build such systems generally includes a field network made up of Programmable Logic Controllers PLCS and industrial field devices on the one hand and a system or control network made up a one or more Human Machine Interfaces HMIs and Supervisory Control And Data Acquisition SCADA system. The communication within and between the field network and the control network is facilitated by one or more communication buses. The communication bus may employ different protocols, such as ModBus or Profibus.

Traditionally, industrial systems aim to optimize uptime and efficiency and to be reliable, repeatable and free of errors. With changes in market demands becoming more dynamic, such industrial systems now more often need to adapt on the fly and be able to ramp production up or down to match changes in demand. Moreover, as there is an increase of demand for more customer specific products, which further leads to smaller batches that need to be delivered with shorter lead times, there is a need for more flexible production and for production systems able to evolve.

Hence, synchronizing supply with customer demand, optimizing use of available capacity and delivering smaller batches in shorter lead times has resulted in the need for modular automation.

Such a modular approach allows the use of different vendors for software and equipment. In order to ensure seamless communication and integration of equipment and software of different vendors, including both different hardware platforms as operating systems, the OPC Unified Architecture framework was developed as a platform independent service-oriented architecture that integrates all functionality of individual OPC Classic specifications into one extensible framework.

Within the OPC UA framework various ways of facilitating communication are available, such as classic client-server or client-server augmented with notifications. In a client-server setup the client sends a request to the server, the server processes the request and delivers the result to the client. In a client-server setup augmented with notifications, the client requests the server to receive notifications of certain items that it will monitor. The server responds by creating the notification at a cyclic rate with a certain predefined interval.

In production environments with numerous equipment wherein small amounts of data are frequently transmitted, a publish-subscribe Pub/Sub setup may be used. A server-publisher sends out data and one or more client-subscribers filter and consume the data; this is referred to as a broadcast, and may have the form of in one-to-many 1:N or many-to-many N:N. In OPC UA the UDP multicast protocol is used.

The Pub/Sub setup may be augmented with a 'broker' service, which acts as an intermediary between server and client. The broker performs the filtering on behalf of different clients in particular queues. The clients are subscribed to the relevant queues of the broker. In addition, the broker may prioritize notifications in each queue.

In industrial systems having communication networks with many nodes, the client-server setup will not be able to comply with real-time timing constraints on messaging. The Pub/Sub setup may accommodate more stringent requirements. However, in order to setup an industrial automation system accordingly, the system has to stop operating, and each PLC has to stop executing its' application(s). This further requires an operator to access an engineering program in order to perform these actions. Though changing a configuration on the fly of a single PLC or other logic or I/O component is possible, changing the setup of Pub/Sub requires all components to adopt the change simultaneously, due the nature of communication which only works if it includes both transmitter and recipient having.

Furthermore, in order to adapt the setup of an industrial system, an operator or system designer needs to use an engineering tool in order to re-configure the communication between equipment connected in the control network, which basically may be referred to as Peer-to-Peer communication between PLCs. This can be especially complex as it may involve heterogenous equipment from different vendors and/or suppliers. Which in the end is a cumbersome task, that does not meet the need for adapting the setup or configuration of in a flexible manner. In addition, it may require the service of external automation experts.

Accordingly, there is a need for an alternative way of re-configuring an industrial system that is more user friendly and provides more agility.

SUMMARY OF INVENTION

It is an object of the invention to facilitate configuring communication within an industrial system more conveniently. And in particular to enable peer-to-peer communication between heterogenous equipment's coming from different vendors and/or manufacturers.

According to the invention, this is achieved by an automation system including at least two control devices, each control device being arranged for executing an automation application using local IEC variables, hosting an OPC UA server as an instance separate from the automation application using OPC UA objects which objects are stored in an address space. Each control device further being arranged for mapping local IEC variables with OPC UA objects, hosting a subscriber service separate from the OPC UA server and hosting a publisher service separate from the OPC UA server. Wherein the subscriber service is arranged for accessing the OPC server address space and storing in the address space OPC UA objects received from at least one publisher service to which the subscriber service is subscribed in accordance with a subscriber configuration. And wherein the publisher service is arranged for accessing the OPC server address space and retrieving OPC UA objects to be published by the publisher service as in accordance with a publisher configuration.

In one aspect, the invention relates to an industrial control device including a controller arranged for executing an automation application using local IEC variables, hosting an OPC UA server using OPC UA objects which objects are stored in an address space, mapping local IEC variables with OPC UA objects, hosting a subscriber service separate from the OPC UA server; and wherein the subscriber service is arranged for accessing the OPC server address space and storing in the address space UA objects received from a publisher service subscribed to in accordance with a subscriber configuration.

In another aspect, the invention relates to an industrial control device including a controller arranged for executing an automation application using local IEC variables, hosting an OPC UA server using OPC UA objects which objects are stored in an address space, mapping local variables with OPC UA objects, hosting a publisher service separate from the OPC UA server, and wherein the publisher service is arranged for accessing the OPC server address space and retrieving OPC UA objects to be published by the publisher service in accordance with a publisher configuration.

In yet another aspect, the invention relates to a method for configuring an industrial automation system including at least two control devices, each control device being arranged for hosting as separate instances an OPC UA server, an OPC UA subscriber service, and an OPC UA publisher service, the method including retrieving an OPC UA object list for each control device, the object list indicating all OPC UA objects managed by each respective control device, and presenting the OPC UA objects and control devices for user input. The method further including obtaining user input, configuring for each control device, based on the user input, publisher service parameters and subscriber service parameters in a configuration file for each respective control device, and transferring the configuration file to the publisher service and subscriber service of each respective control device.

The automation system, industrial control devices and method all aim at implementing a publisher-subscriber server configuration in control devices of an automation system, wherein the publisher and subscriber services are running as independent instances separate from a control device application program and separate from an OPC UA server instance. This allows to configure the publisher-subscriber service for each control device using OPC UA protocols without the need of altering or re-deploying any control device application program. This means that there is also no need of re-opening any engineering configuration software of any PLC vendor for each control device part of the peer-to-peer communication network.

Accordingly, change of pub-sub configuration may be made on the fly and hence re-configuring peer-2-peer communication between control devices of different vendors using OPC UA protocols is enabled without the need to stop operation of the system.

Further objects, aspects, effects and details of particular embodiments of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawing, wherein.

DETAILED DESCRIPTION

Figure 1:
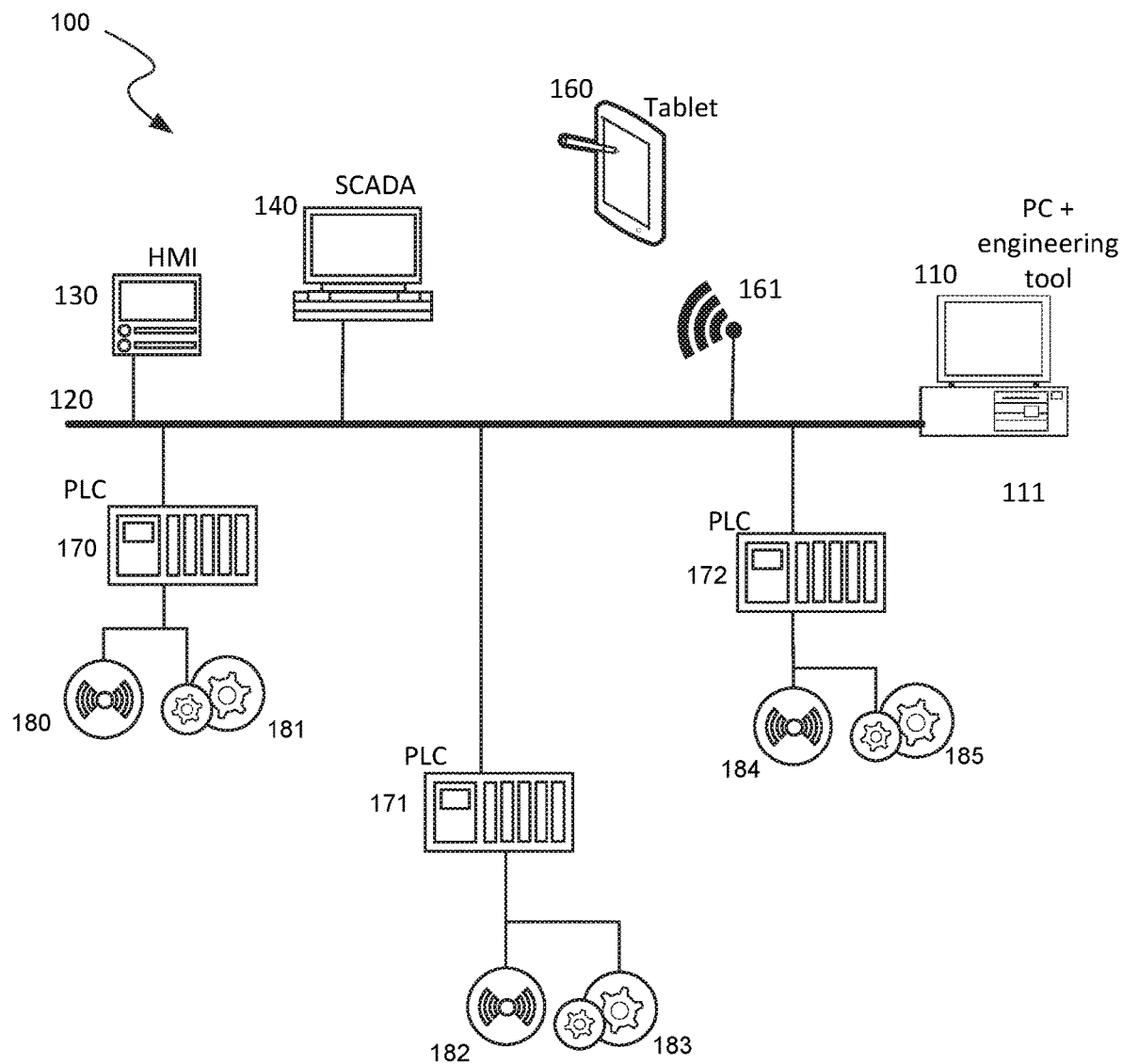
FIG. 1 illustrates schematically an example of an automation system.

Referring to FIG. 1, an example of an automation system 100 is shown in which data is exchanged by means of Publication-Subscribe communication, Pub-Sub in short, between automation components. The system 100 includes a PC running an engineering tool 110 which allows setting up communication within the system 100. As protocol for machine to machine communication, i.e. Peer-2-Peer communication, such as within the exemplary system of FIG. 1, the OPC Unified Architecture protocol as developed by the OPC Foundation is preferably implemented.

A central communication bus 120 connects the various elements of the system 100. These include components for providing interaction of the operator with the system 100, such as a Human Machine Interface HMI 130, a SCADA module 140, and a tablet 160 that can connect via a wireless connection point 161. Further included are automation hardware components, commonly referred to as edge or field devices, such as various sensors 180, 182 and 184, and actuators 181, 183 and 185 that are connected to control devices 170-172, which in turn are connected to the central communication bus 120. The control devices 170-172, in this example Programmable Logic Controller PLCs, may communicate via the central communication bus 120 with various components for operator control, such as the HMI 130, SCADA module 140 and tablet 160.

Figure 2:
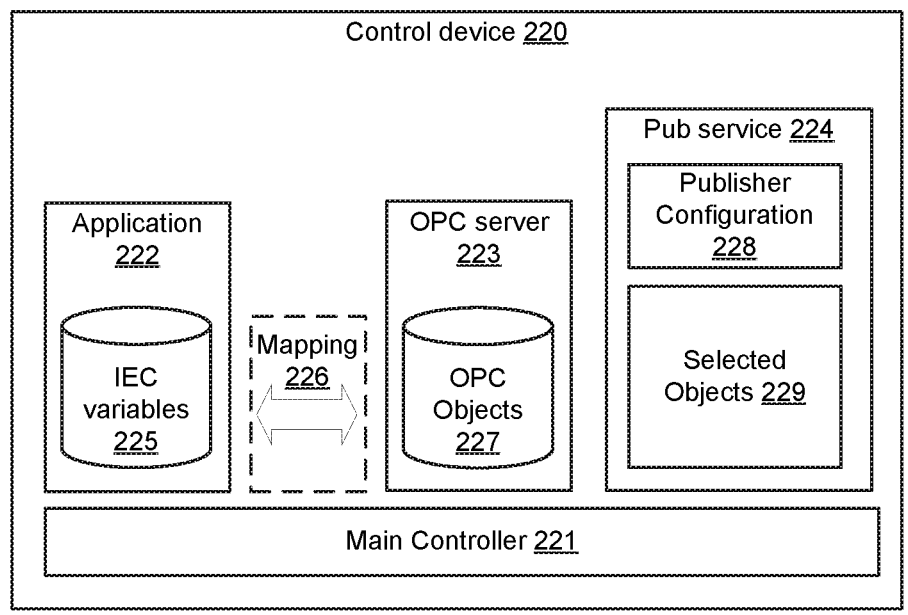
FIG. 2 illustrates schematically an example of a control device with a publisher service in accordance with the invention.

Referring to FIG. 2, a control device 220, such as e.g. PLC 170 of FIG. 1, is shown. The control device 220 has a main controller 221 which executes an automation program application 222, an OPC server application 223 and a publisher service 224. The OPC server application 223 and the publisher service 224 are executed as separate processes, meaning that these are run independently from each other, only sharing resources of the controller 221. In that sense the OPC server and publisher service are decoupled from each other. The program application 222 employs local process/automation variables, such as e.g. IEC variables in accordance with IEC standard 61131 and/or IEC61499. The OPC server includes an OPC objects database 227 which may store OPC UA objects and other automation variables for exchange. A mapping 226 defines which IEC variables 225 of the program application 222 are linked to which OPC UA objects of the OPC database 227 and allows exchange of data between the program 222 and OPC server 223.

The publisher service 224 includes a publisher configuration set 228 and a publish selection set 229. The selection set 229 includes a list of objects from among objects available in the OPC database 227 which may be selected for publishing (by the OPC server 223). The OPC server 223 will include the selected objects of the selection set 229 when it performs a publishing communication.

Figure 3:
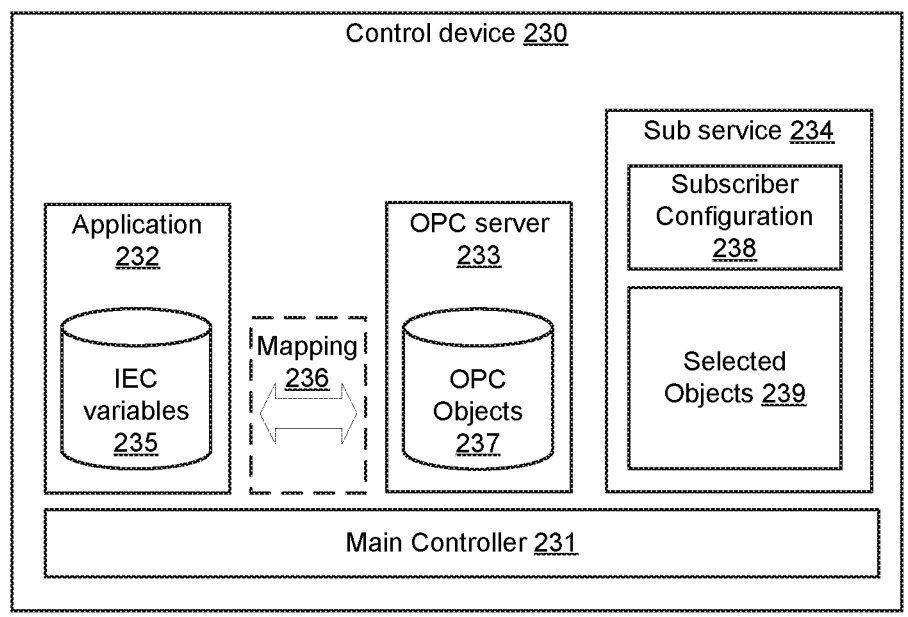
FIG. 3 illustrates schematically an example of a control device with a subscriber service in accordance with the invention.

Referring to FIG. 3, another control device 230, such as e.g. PLC 171 in FIG. 1, is shown. The control device 230 has a main controller 231 which executes a second automation program application 232, an OPC server application 233 and a subscriber service 234. The OPC server application 233 and the subscriber service 234 are executed as separate execution processes, meaning that these are run independently from each other, only sharing resources of the controller 231. In that sense the OPC server and subscriber service are decoupled from each other. The program application 232 employs local process and/or automation variables, such as e.g. IEC variables in accordance with IEC standard 61131 and/or IEC61499. The OPC server includes an OPC objects database 237 which may store OPC UA objects and other automation variables for exchange. A mapping 236 defines which IEC variables 235 of the program application 232 are linked to which OPC UA objects of the OPC database 237 and allows exchange of data between the program 232 and OPC server 233.

The subscriber service 234 includes a subscriber configuration 238 and a subscribe selection set 229. The selection set 229 includes a list of objects from among objects present and/or available in the OPC database 227 for which values may be stored. From among the available objects, objects may be selected for subscribing (the OPC server 223). The OPC server 223 will include the selected objects of the selection set 229 when it responds to a publishing communication from another OPC server.

Both the publisher configuration 228 of the publisher service 224 and the subscriber configuration 238 of the subscriber service 234 may be accessed via a user interface as made available e.g. on the tablet 160 of FIG. 1. The user interface may be part of a specific software program or a dedicated stand-alone application program. As both the publisher configuration 228 and the subscriber configuration 238 are separated from the execution of the IEC application, this arrangement permits the operator to adjust on the fly the Peer-2-Peer communication parametrization independently of the state of each of the respective control device applications 222 and 232.

As described above, each control device hosts an instance of an OPC UA server and of a publisher service and/or subscriber service. Moreover, in the control devices several instantiations of subscriber services and publisher services may be instantiated and executed in parallel. Hence, from an operatively or functional perspective, an OPC UA server may be able to embed one or several instances of OPC UA subscriber service and one or several instances of OPC UA publisher service. Accordingly, for each instantiated publisher service there may be a dedicated publisher configuration or there may a single joined configuration. Likewise, for each instantiated subscriber service there may be a dedicated subscriber configuration or there may be a single joined configuration.

Figure 4:
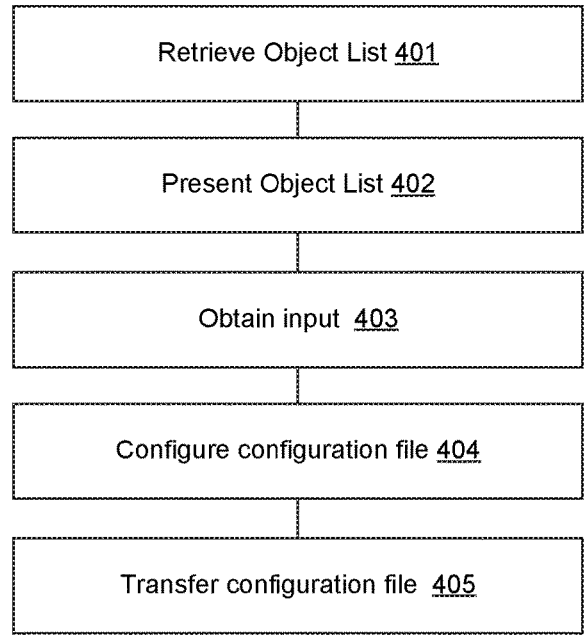
FIG. 4 illustrates schematically a method for changing a pub-sub configuration on the fly in accordance with the invention.

Referring to FIG. 4, an example of a method for changing a pub-sub configuration on the fly is shown. The example of FIG. 4 may be performed within the automation system 100 of FIG. 1. Hence, the method will be elucidated also by reference to FIG. 1 As one of the initial steps, the method includes retrieving 401 an OPC UA object list for each control device present in the automation system 100. The object lists indicate all OPC UA objects and variables managed by each respective control device 170-172, as well as configuration parameters for the publisher service 224 and subscriber service 234.

Retrieving 401 the object list for each control device 170-172 may include scanning one or more configuration files from each control device for identifying OPC UA objects. This scanning may be performed while the system is operating, i.e. on line. Or it may be done by collecting the objects from files readily available, such as e.g. a Node Set description file (Opc.Ua.PackML.NodeSet.xml) or other files and documentation created during the initial setup of the automation system.

The OPC UA objects of these object lists and the respective control devices are presented 402 for user input. This may be done by displaying them via the user interface of the program available on tablet 160, or another device arranged for displaying the user interface of such a program. The operator of the automation system 100 may review and verify the presented information. Depending on whether the lists comply with the same naming convention, meaning that respective variables have the same name among the various control devices, the operator may simply approve the presented list or may need to alter and link certain specific variables. This is referred to as direct or indirect mapping and will be explained further below.

The method proceeds by obtaining 403 the user input and continues by configuring 404 for each control device 170-172, based on the obtained user input, publisher service parameters and subscriber service parameters in a configuration file for each respective control device 170-172.

When for each respective control device 170-172 a configuration file is created, these configuration files are transferred 405 to each respective control device 170-172. Each control device 170-172 will then update its' respective publisher configuration 228 and subscriber configuration 238.

As mentioned above, depending on whether a uniform naming convention is complied with, the naming of the OPC UA objects and variables may need to be reviewed and/or verified. This verification will provide a matched list of variables of both the publisher and subscriber service. This is because the peer-2-peer communication configuration is realized using the OPC UA description of objects and variables instead of using direct IEC variables from the automation i.e. PLC application.

Figure 5:
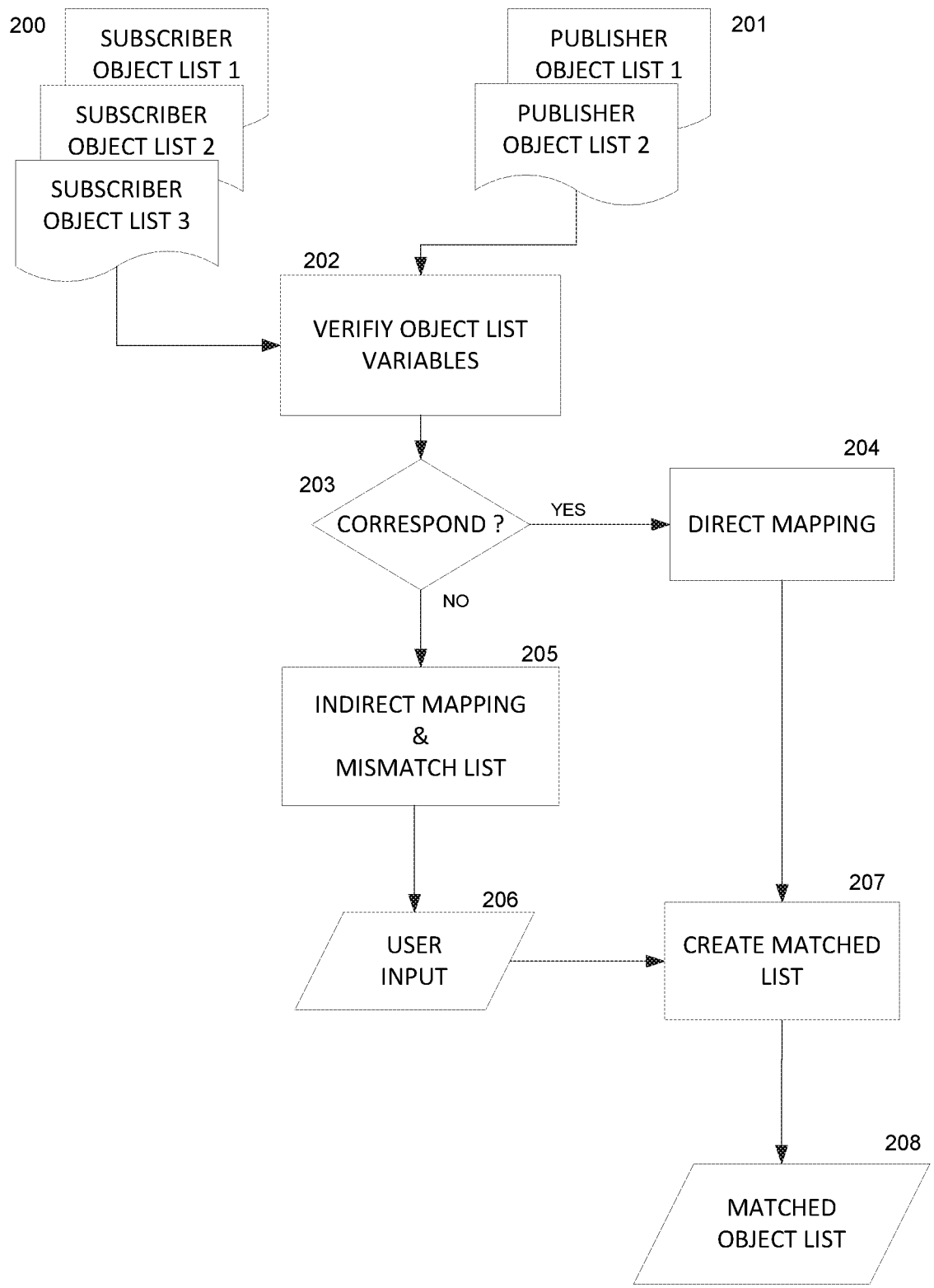
FIG. 5 illustrates an example of a flow chart for creating a matched object list for changing a pub-sub configuration on the fly in accordance with the invention.

Referring to FIG. 5, an example is shown of a flow chart for creating a matched object list for changing a pub-sub configuration on the fly. This process of verifying 202 whether object list variables from subscriber service and publisher service stars from subscriber object lists 200 and publisher object list 201.

If object list variables of the publisher object lists 201 and subscriber object lists 200 correspond, an indication of direct mapping 204 is presented e.g. via the user interface of the tablet 160. As user input, the user may just confirm the presented object list, or provide additional desired mappings. The verification process creates 207 a matched list of objects which is made available as output 208 to be used for creating the configuration files for the respective control devices 170-172.

If object list variables of publisher object lists and subscriber object lists fail to correspond, an indication of indirect mapping 205 is presented e.g. via the user interface of the tablet 160. The indirect mapping 205 is presented together with a mismatch list 205 of OPC UA objects that need to be matched for user input. An operator may indicate which objects and/or variables correspond and how objects and/or variables are to be mapped while ensuring that object type categories correspond.

On obtaining user input 206; the verification process proceeds by creating 207 a matched objects list indicating the correspondence between publisher and subscriber OPC UA objects and/or variables. The resulting final matched object list is made available as output 208 to be used for creating the configuration files for the respective control devices 170-172. With the respective configuration files created, these are transferred to each respective control device 170-172, which will update its' respective publisher configuration 228 and subscriber configuration 238 accordingly. Once updated, the peer-to-peer communication according to the new setup is ready for use.

Figure 6:
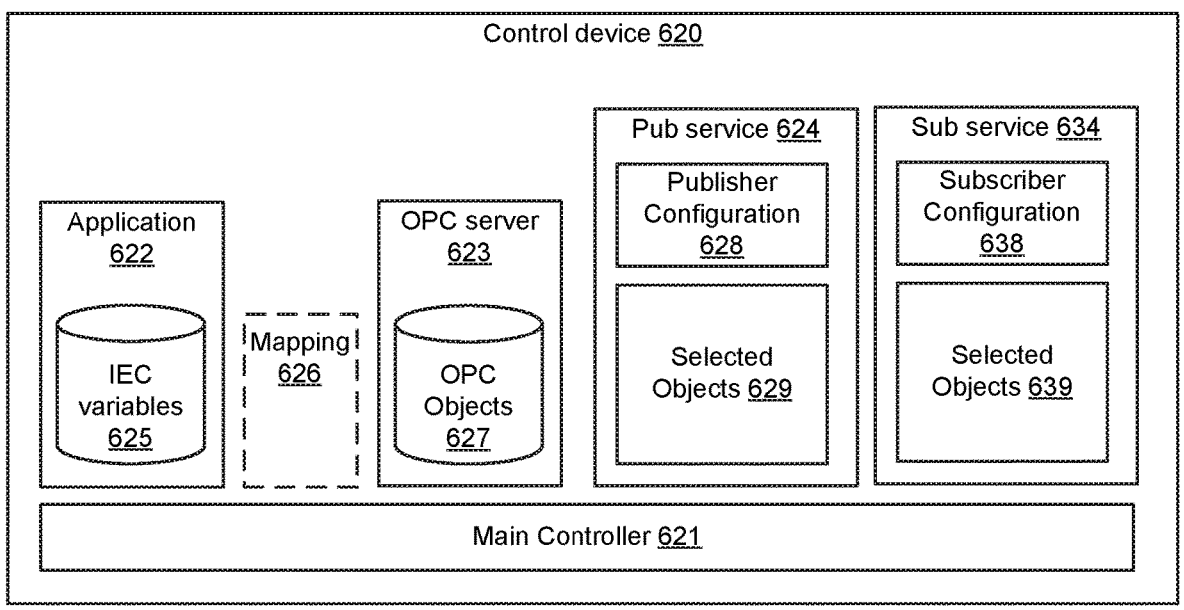
FIG. 6 illustrates schematically an example of a control device with both a publisher service and a subscriber in accordance with the invention.

Referring to FIG. 6, a control device 620 is shown that includes both a publisher service 624 as well as a subscriber service 634. The control device 620 has a main controller 621 similar to that of main controller 221 of FIG. 2, which executes an automation program application 632, an OPC server application 633 a publisher service 624 and a subscriber service 634. The OPC server application 633, the publisher service 624 and the subscriber service 234 are executed as separate execution processes, meaning that these are run independently from each other, only sharing resources of the controller 631. The program application 632 employs local process and/or automation variables, such as IEC variables in accordance with IEC standard 61131 and/or IEC61499. The OPC server includes an OPC objects database 637 which may store OPC UA objects and other automation variables for exchange. Mapping 636 defines which IEC variables 635 of the program application 632 are linked to which OPC UA objects of the OPC database 637 and allows exchange of data between the program 632 and OPC server 633.

Although the present invention has been described above with reference to specific embodiments, it is not intended to be limited to the specific form set forth herein. Rather, the invention is limited only by the accompanying claims and, other embodiments than the specific above are equally possible within the scope of these appended claims. For example, an automation system may employ a mix of differently setup control devices, such as some setup only with a subscriber service, some setup only with a publisher service and some setup as with both subscriber and publisher services. It may even be conceived that one control device is setup with multiple OPC UA server, allowing to support different peer-to-peer communication in alternative ways.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. Industrial automation system comprising:
at least two control devices;
wherein each of the at least two control devices is arranged for:
executing an automation application using local IEC variables;
hosting an OPC UA server as an instance separate from the automation application using OPC UA objects, which objects are stored in an address space;
mapping local IEC variables with OPC UA objects;
hosting a subscriber service separate from the OPC UA server;
hosting a publisher service separate from the OPC UA server; and
wherein the subscriber service is arranged for accessing the OPC server address space and storing in the address space OPC UA objects received from at least one publisher service to which the subscriber service is subscribed in accordance with a subscriber configuration;
wherein the publisher service is arranged for accessing the OPC server address space and retrieving OPC UA objects to be published by the publisher service as in accordance with a publisher configuration.

2. Method for configuring an industrial automation system comprising at least two control devices, each of the at least two control devices is arranged for hosting as separate instances an OPC UA server, an OPC UA subscriber service, and an OPC UA publisher service, the method comprising:
retrieving an OPC UA object list for each control device, the object list indicating all OPC UA objects managed by each respective control device;
presenting the OPC UA objects and control devices for user input;
obtaining user input;
configuring for each control device, based on the user input, publisher service parameters and subscriber service parameters in a configuration file for each respective control device;
transferring the configuration file to the publisher service and subscriber service of each respective control device.

3. Method according to claim 2, wherein retrieving the object list for each control device comprises scanning one or more configuration files from each control device for identifying OPC UA objects.

4. Method according to claim 2, further comprising:
verifying whether object list variables from subscriber service and publisher service correspond; and
if object list variables of publisher service and subscriber service correspond, presenting an indication of direct mapping;
if object list variables of publisher service and subscriber service fail to correspond, presenting an indication of indirect mapping and a mismatch list of OPC UA objects that need to be matched for user input;
obtaining user input; and
creating, based on the user input, a matched objects list indicating correspondence between publisher and subscriber OPC UA objects.

5. Method according to claim 2, wherein for each OPC UA object presented for user input an object category is indicated, the object category defining the type of variable, validity range of variable value, and/or measuring unit.

6. Method according to claim 2, wherein the user input comprises a list of OPC UA objects selected for peer-to-peer communication.

7. Method according to claim 2, wherein creating the matched list comprises a check on OPC UA object category correspondence between matched pairs of OPC UA objects.

8. Industrial control device, comprising
a controller;
wherein the controller is arranged for:
executing an automation application using local IEC variables;
hosting an OPC UA server using OPC UA objects, which objects are stored in an address space;
mapping local IEC variables with OPC UA objects;
hosting a subscriber service separate from the OPC UA server; and
wherein the subscriber service is arranged for accessing the OPC server address space and storing in the address space UA objects received from a publisher service subscribed to in accordance with a subscriber configuration.

9. Industrial control device, comprising
a controller;
wherein the controller is arranged for:
executing an automation application using local IEC variables;
hosting an OPC UA server using OPC UA objects, which objects are stored in an address space;
mapping local variables with OPC UA objects;
hosting a publisher service separate from the OPC UA server; and
wherein the publisher service is arranged for accessing the OPC server address space and retrieving OPC UA objects to be published by the publisher service in accordance with a publisher configuration.

10. Industrial control device according to claim 9, wherein the controller is further arranged for:
hosting a subscriber service separate from the OPC UA server; and
wherein the subscriber service is arranged for accessing the OPC server address space and storing in the address space UA objects received from a publisher service subscribed to in accordance with a subscriber configuration.

* * * * *